Feb. 24, 1970   F. SAUTHOFF ET AL   3,497,270
BRAKING VALVE FOR RAILWAY VEHICLE AIR BRAKES
Filed March 4, 1968   2 Sheets-Sheet 1
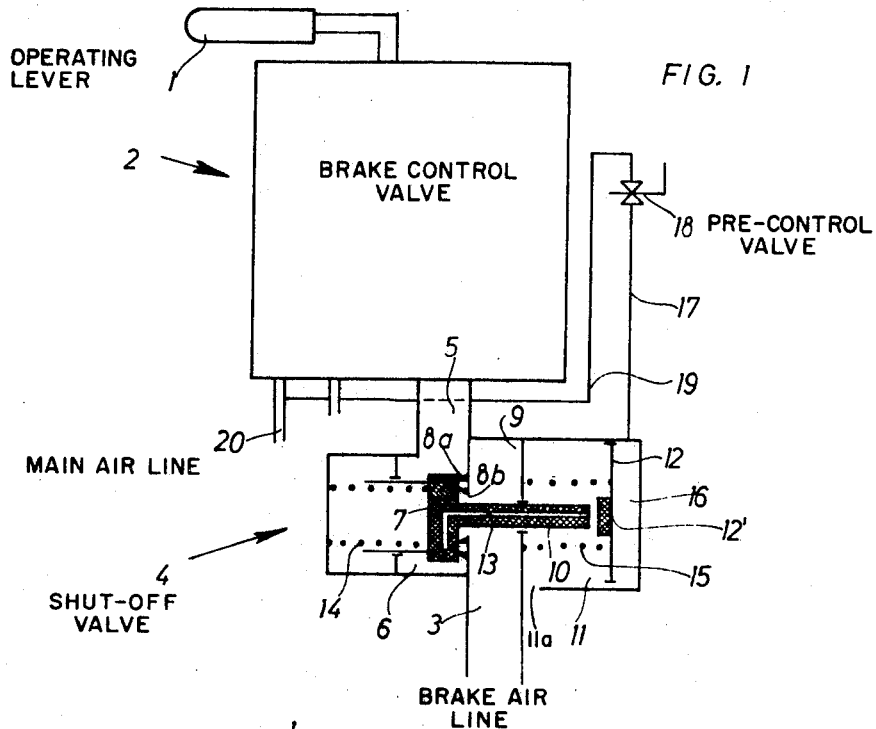
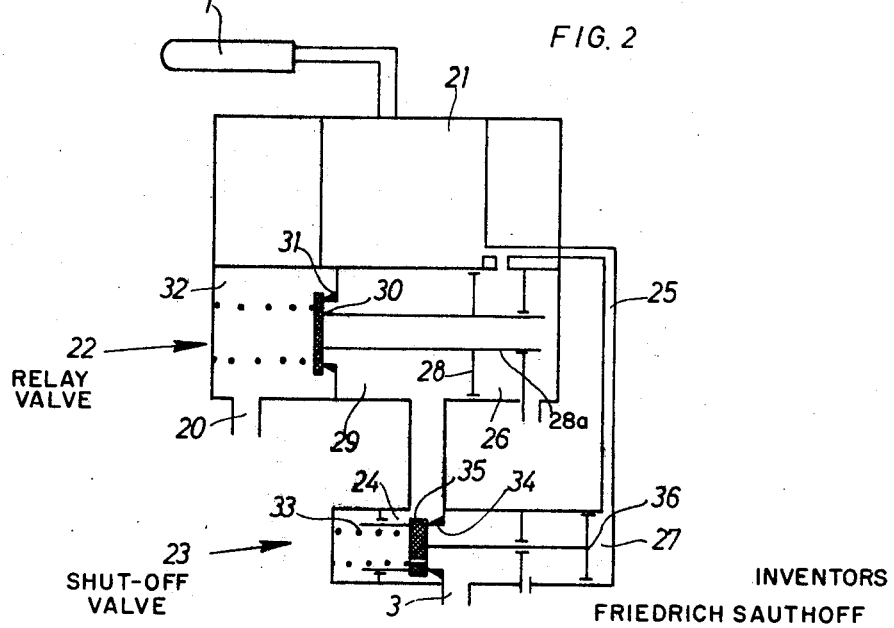
INVENTORS
FRIEDRICH SAUTHOFF
JOHANN HUBER
ERICH FALKE
BY *Edmund M. Jaskiewicz*
ATTORNEY

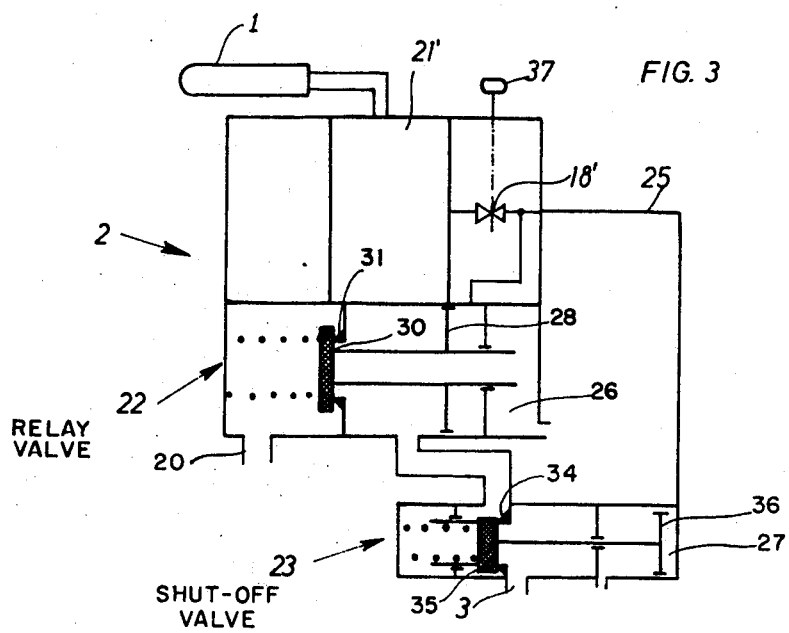
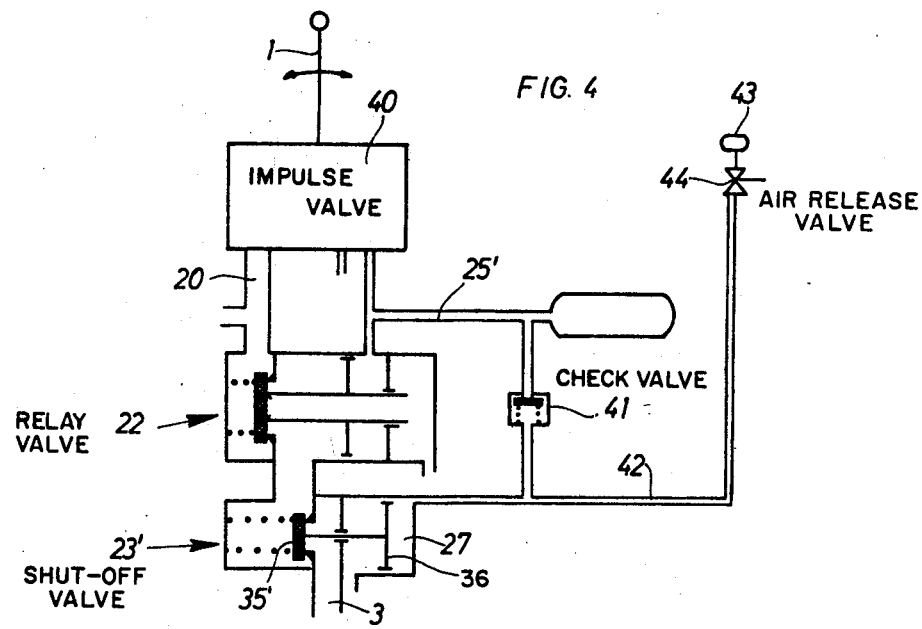

United States Patent Office 3,497,270
Patented Feb. 24, 1970

3,497,270
BRAKING VALVE FOR RAILWAY VEHICLE
AIR BRAKES
Friedrich Sauthoff, Bierpohlweg, and Johann Huber and Erich Falke, Munich, Germany, assignors to Knorr-Bremse GmbH, Munich, Germany, a corporation of Germany
Filed Mar. 4, 1968, Ser. No. 710,107
Int. Cl. B60t 17/16
U.S. Cl. 303—89                                      7 Claims

ABSTRACT OF THE DISCLOSURE

The air braking system of a railway vehicle is provided with a shut-off valve which is connected between the control brake valve and an air line that extends to the braking mechanism. The shut-off valve is provided with an air releasing system connected to a chamber on the side toward the control brake valve so that air will be released from the chamber to the atmosphere when the shut-off valve is in the closed position.

---

The present invention relates to the control valve mechanism of an air braking system for railway vehicles, more particularly, to the shut-off valve interconnected between the control brake valve and the air line leading to the braking mechanism.

In railway vehicles, the air braking system is generally under the control of the vehicle operator or driver who may be located in a control cab and who actuates a brake control valve to apply or release the brakes. The brake control valve has an air line extending therefrom which conveys air under pressure to the braking mechanism. The brake control valve regulates the pressure introduced into this air line and the braking mechanism acts in response to this regulated pressure. A shut-off valve is generally located between the brake control valve and the air line leading to the braking mechanisms and in its usual form comprises a simple shut-off valve. Such shut-off valves have the disadvantage that should they develop a leak there is a danger of the brake control valve responding in an undesired manner to the pressure in the brake air line. The results of such a shut-off leakage would be apparent from the following example: The operator's brake control valve is adjusted to the traveling position so as to be under regulation air pressure. The brakes are applied and the brake air line is under a corresponding low pressure. Should a leak develop in the shut-off valve the pressure in the brake air line could increase up to the regulation pressure at which time the brakes would be released and the vehicle would be free to roll away.

It is therefore the principal object of the present invention to provide a novel and improved air braking system for railway vehicles.

It is another object of the present invention to provide a shut-off valve as described above which will prevent the undesired release of brakes should a leak occur within the shut-off valve.

The objects of the present invention are achieved and the disadvantages of the prior art are eliminated by the shut-off valve mechanism disclosed as the present invention. The shut-off valve is of the general type which is interconnected between the brake control valve and the air line leading to the braking mechanism of a railway vehicle air braking system. In one aspect of the present invention the shut-off valve may be provided with a valve member which is movable therein between open and closed positions. Means are provided immediately adjoining the valve member to form a chamber in the direction of the brake control valve. Additional means are connectable to the chamber for communicating the chamber to the atmosphere when the valve member is in the closed position. Should there be any leakage in the valve member air pressure from either the brake air line or the brake control valve will flow into the chamber and be exhausted to the atmosphere. By exhausting any such leakage a build-up of air pressure will be prevented. Further means are provided to open this shut-off valve when the driver of the railway vehicle desires to operate the brake control valve so as to control the brakes.

Other objects and advantages of the present invention will be apparent upon reference to the accompanying description when taken in conjunction with the following drawings, which are exemplary, wherein;

FIGURE 1 is a schematic drawing illustrating the shut-off valve mechanism according to the present invention; and FIGURES 2–4 are views similar to that of FIGURE 1 and showing different modifications of the present invention.

Proceeding next to the drawing wherein like reference symbols indicate the same parts throughout the various views, a specific embodiment and several modifications of the present invention will be described in detail.

As may be seen in FIGURE 1 the brake control valve which is operated by the driver of the railway vehicle is indicated generally at 2 and is provided with a hand lever 1 for regulating the pressure delivered to a main air brake line 3 which leads to the braking mechanism. A shut-off valve indicated generally at 4 is interconnected between the brake air line 3 and the brake control valve 2 and communicates with the control valve through a tubular conduit 5. Conduit 5 transmits the controlled pressure from the control valve to a space 6 in the shut-off valve in which there is provided a valve member 7 engageable with a double valve seat 8a, 8b. The double valve seat is fixedly mounted in a radial plane of the shut-off valve 4 and controls the communication between the space 6 and a space 9 to which the main brake air line 3 is connected.

The valve member 7 is provided with a hollow valve stem 10 which is slidably mounted within space 9 but extends into a space 11 which is permanently in communication with the atmosphere through the opening 11a. Movably mounted within the space 11 is a piston 12. The valve stem 10 is provided with an air duct 13 extending longitudinally therethrough with one end open at a flat surface formed in one end of the valve stem. The other end of the duct traverses the valve member 7 and opens into the chamber formed between the two concentric valve seats 8a and 8b. A spring 14 urges the valve member into the seated position on the double valve seat. The movable piston 12 is provided with a sealing plate 12' which engages the flat end surface of the valve stem having the duct opening therein.

Within the space 11 there is provided a spring 15 which holds the piston 12 in the position as illustrated to form a further chamber 16. The chamber 16 is connected through a conduit 17 to a manually operated pre-control shut-off valve 18. When the valve 18 is in the open position it provides communication between conduit 17 and a conduit 19 which leads to a main air line 20 for supplying the brake control valve 2 with air under pressure. When valve 18 is in the closed position the conduit 19 is shut off and conduit 17 is open to the atmosphere so that any air pressure therein is released to the atmosphere.

When the pre-control valve 18 is closed, the cylindrical space 16 is without pressure and the piston 12 is urged to the right by spring 15 as shown in FIGURE 1 to open the end of the valve stem 10. The spring 14 holds the valve member 7 against the double valve seat 8a, 8b, and thereby interrupts any communication between the spaces 6 and 9. The annular chamber between the double valve seats 8a and 8b is in communication with the atmosphere through air duct 13, space 11 and opening 11a. In the event there is any leakage between valve member 7 and the valve seats 8a, 8b, the air under pressure which will flow either from the brake air line 3 or from the space 6 will pass into the chamber between the double valve seats and escape through air duct 13 to the atmosphere. With this shut-off valve mechanism as described above the worst that could occur in the brake air line 3 is a decrease in pressure which would not be dangerous since it would increase the braking effect. There could not be any undesired release of the brakes since there is no possibility of an increase in pressure in the brake air line 3.

When the pre-control valve 18 is opened, the air under pressure will flow from the main air line 20 through conduits 19 and 17 into the space 16 to move the piston 12 to the left against the force of spring 15. The sealing plate 12' will engage the end of valve stem 10 to close this end of air duct 13. Upon further movement of the piston 12 the valve member 7 will also be moved to the left away from valve seats 8a, 8b. With this movement of the valve member communication will be provided from space 6 to space 9. The brake control valve 2 is now connected to the brake air line 3 and will regulate the air pressure therein in response to the driver's manipulation of the operating handle 1.

When it is desired to render the brake control valve 2 inoperative the pre-control valve 18 is closed. In the manner as described above the shut-off valve 4 will return to the setting as illustrated in FIGURE 1.

As one modification of the embodiment illustrated in FIGURE 1, a manually actuated member may be substituted for piston 12 and its sealing plate 12'. This member will control the open end of the air duct 13 in the same manner as accomplished by the sealing plate 12'.

In FIGURE 2, there is illustrated a modification of the shut-off valve according to the present invention as incorporated with a brake control valve having a relay valve. In this modification the operating lever 1 controls a pressure regulator 21 which in turn controls a relay valve 22. The shut-off valve is indicated generally at 23 and comprises a chamber 24 from which air is released to pass into the brake air line 3. The air pressure that is controlled by the pressure regulator 21 flows through a conduit 25 to a control chamber 26 in the relay valve 22 and to a space 27 in the shut-off valve 23. The pressure in control chamber 26 acts upon a piston 28 carried by a slidably mounted hollow piston rod 28a. The other side of piston 28 forms a wall of a space 29 which is continually in communication with space 24 in the shut-off valve 23. The piston 28 controls a double valve 30, 31 which regulates the communication between space 29 and a space 32 that is continually supplied with compressed air from main air line 20 and the communication between space 29 and the atmosphere. The shut-off valve 23 is provided with a spring 33 which urges a valve member 35 into closed position with a stationary valve seat 34. The movement of valve member 35 is controlled by a piston 36 in response to the pressure in the space 27. The valve formed by valve member 35 and valve seat 34 controls the communication between space 24 in the shut-off valve 23 and the brake air line 3.

To shut off the brake control valve so as to render it inoperative, the operating lever 1 is moved into the position where the pressure regulator reduces the pre-control pressure in conduit 25 to atmospheric pressure. In the absence of any pressure in space 27 the valve member 35 will be closed on valve seat 34 under the action of spring 33. The space 24 is thereby cut off from communication with the brake air line 3. At the same time, the control chamber 26 is without pressure so that the space 29 and space 24 are open to the atmosphere through valve 30. Should any leakage occur in shut-off valve 23 or in valve 31, the compressed air will escape from the brake air line 3 or from space 32 into the space 29 where the escaped air will move piston 28 to the right and thus escape to the atmosphere through the valve 30 and hollow piston rod 28a. It is therefore apparent that it will be impossible for leakage to cause any increase of pressure in the brake air line 3. At the most, a drop of pressure could result in the brake air line 3 after it has been shut off. Therefore, with this arrangement there can be no undesired disengagement or release of the brakes when the shut-off valve 23 is closed.

When the operating level 1 is moved out of the shut-off position, a pre-control pressure greater than atmospheric pressure will be introduced into conduit 25. The increase in pressure in the control chamber 26 will move piston 28 to the left to close valve 30 and, concurrently, the pressure will be increased in space 27 to move piston 36 to the left to open valve member 35 from its valve seat 34. Upon opening of valve member 35 the brake air line 3 will be in communication with space 29 through the shut-off valve 23. The air pressure in the space 29 will be in response to the pressure as regulated by positioning of operating lever 1 since this pressure will move piston 28 to the left to open valve 31 and thereby introduce compressed air from the main air line 20, into space 32 and into space 29 through the open valve 35 to the brake air line 3. Thus, the pressure in the brake air line 3 will be in response to the pre-control pressure.

In some brake control valve structures it may occur that the pre-control pressure cannot be lowered to the atmospheric pressure when the pressure regulator is in its shut-off position. In FIGURE 3, which is a modification of FIGURE 2, conduit 25 is connected to the pressure regulator 21' through a pre-control valve 18' which is operated by a removable handle 37. The pre-control valve 18' connects conduit 25 to the pressure regulator 21' only when the brake control valve 2 is not shut off. When the brake control valve 2 is shut off, a pre-control valve 18' will disconnect conduit 25 from the pressure regulator 21' and air will be released from the conduit 25 to the atmosphere. A subsequent operation of the apparatus and the brake control valve in combination with the relay valve 22 and the shut-off valve 23 will be the same as that described for the modification of FIGURE 2.

In the modification of FIGURE 4, the control brake valve is provided with a pressure regulator 40 having a hand operable impulse valve. The pre-control pressure is similarly directed into a conduit 25' which is provided with a check valve 41 and then into the space 27 of shut-off valve 23'. The pressure in conduit 25' will be varied only during operation of the operating lever 1. When the operating lever 1 is not operated, conduit 25' is disconnected from both the main air line 20 and the atmosphere. The pre-control pressure is delivered to the relay valve 22 in a manner as illustrated and described for the modifications of FIGURES 2 and 3. A conduit 42 is connected from the space 27 of shut-off valve 23' to an air release valve 44 which is operated by a key actuated lever 43.

When the brake control valve is shut off, the air release valve 44 is opened and the conduits 42 and 25' together with the shut-off valve space 27 are open to the atmosphere. The shut-off valve 23' is closed and functions in the same manner as the modification of FIGURE 2 to prevent any undesired increase in pressure in the brake air line 3. In order to connect the brake control valve, the lever 43 is actuated to close air release valve 44. Should the impulse valve of the pressure regulator be actuated to produce a pre-control pressure greater than atmospheric pressure in conduit 25', air under pressure will flow through check valve 41 into cylinder space 27 to bear against piston 36 to open the shut-off valve 23' The pressure in the brake air line 3 is then regulated by the relay valve 22 in a known manner.

The apparatus as illustrated in FIGURE 4 can also be used for those brake control valves wherein the pressure regulating component is not in the form of an impulse valve but it is in the form of a pressure regulator such as the component 21 illustrated in FIGURE 2 which in the shut-off position lowers the pre-control pressure to atmospheric pressure.

The apparatus of FIGURE 4 is advantageous over the apparatus of FIGURE 2 since it is possible to achieve a quick braking action by complete lowering of the pre-control pressure to atmospheric pressure. Should the apparatus of FIGURE 2 be subjected to such a quick braking the shut-off valve 23 would be closed to produce an undesired shut-off. However, in the apparatus of FIGURE 4 a pressure would be stored above the check valve 41 in the space 27 which would maintain the shut-off valve 23' open even during this quick braking action.

It is therefore apparent that the present invention has provided a shut-off valve structure which prevents the buildup of pressure in the brake air lines should any leakage occur in the shut-off valve. At the same time the improved shut-off valve of the present invention is quickly operable in response to braking pressures produced by the brake control valve to permit a regulated flow of compressed air from the main air line to the brake air line. The teachings of the present invention may be incorporated in a brake control valve with or without a relay valve or in a brake control valve operable by an impulse valve. This shut-off mechanism is not only simple in structure so as to operate reliably over a long period of time but also provides accurate and dependable results.

It will be understood that this invention is subject to modification in order to adapt it to different uses and conditions.

What is claimed is:

1. A shut-off valve for interconnection between the brake control valve and the air line leading to the braking mechanism of a railway vehicle air braking system, and comprising means within said valve for defining an air passage between the brake control valve and the brake air line, a valve member movable between positions to open and close said air passage to control the flow of air therethrough, means within said air passage and adjoining said valve member for defining a chamber in the direction of the brake control valve, means connectable to said chamber for communicating said chamber to the atmosphere when said valve member is in the closed position in said air passage, and means responsive to said valve member being in said open and closed positions for respectively closing and opening said communicating means to the atmosphere.

2. A shut-off valve as claimed in claim 1 and further comprising a double valve seat engageable by said valve member in the closed position, said valve member having a duct therein opening into the space between said double valve seat when said valve member is closed, and means in said shut-off valve for opening said duct to the atmosphere when the valve member is closed and closing said duct from the atmosphere when said valve member is open.

3. A shut-off valve as claimed in claim 2 with one end of said duct opening between said double valve seat and the other end opening on a flat surface on said valve member, an actuating member movable against and away from said valve member and engageable with said valve member flat surface, and means for moving said actuating member away from said valve member flat surface when said valve member is closed so that said duct other end is open to the atmosphere.

4. A shut-off valve as claimed in claim 3 and further comprising means for moving said actuating member against said valve member in a direction to open said valve member, said duct other end engaged and being closed by said actuating member when said valve member is open.

5. A shut-off valve as claimed in claim 1 wherein the brake control valve has a relay valve and the shut-off valve is between said relay valve and the air line, and further comprising a valve seat engageable by said valve member in the closed position, and means responsive to the pre-control pressure in the relay valve for closing said valve member when said pre-control pressure is atmospheric.

6. A shut-off valve as claimed in claim 5 and further comprising spring means urging said valve member into the closed position, and a piston movable within said shut-off valve and responsive to said pre-control pressure when said pressure is above atmospheric, said piston being movable against said valve member to open said valve member against the force of said spring means when said pre-control pressure is above atmospheric pressure.

7. A shut-off valve as claimed in claim 6 wherein the brake control valve has a separate manually operated shut-off lever, and further comprising a check valve connected to said shut-off valve on the side of said piston responsive to said pre-control pressure in a direction to permit the flow of pre-control pressure from said relay valve, an air release valve connected to said shut-off valve on said side of said piston and having a lever operable to a shut-off position, said shut-off valve being open to the atmosphere through said air release valve when said air release valve is in the shut-off position.

References Cited
UNITED STATES PATENTS

| | | | |
|---|---|---|---|
| 203,947 | 5/1878 | Saunders | 137—608 X |
| 543,022 | 7/1895 | Hunt | 303—50 |
| 3,059,975 | 10/1962 | Morse | 303—40 X |
| 3,259,439 | 7/1966 | Bueler | 303—40 |

MILTON BUCHLER, Primary Examiner

J. J. McLAUGHLIN, Jr., Assistant Examiner

U.S. Cl. XR

137—312; 303—40, 68, 73, 75